United States Patent [19]

Goodwin

[11] Patent Number: 5,674,967
[45] Date of Patent: Oct. 7, 1997

[54] WATER REPELLENT SURFACE TREATMENT WITH INTEGRATED PRIMER

[75] Inventor: George B. Goodwin, Cranberry Township, Pa.

[73] Assignee: PPG Industries, Inc., Pittsburgh, Pa.

[21] Appl. No.: 727,698

[22] Filed: Sep. 23, 1996

Related U.S. Application Data

[63] Continuation of Ser. No. 461,464, Jun. 5, 1996, abandoned, which is a continuation-in-part of Ser. No. 363,803, Dec. 27, 1994, Pat. No. 5,523,161, which is a continuation-in-part of Ser. No. 220,353, Mar. 30, 1994, abandoned, which is a continuation-in-part of Ser. No. 589,235, Sep. 28, 1990, Pat. No. 5,308,705, which is a continuation-in-part of Ser. No. 503,587, Apr. 3, 1990, Pat. No. 4,983,459.

[51] Int. Cl.$^6$ .................................................. C08G 77/24
[52] U.S. Cl. ............................. 528/42; 556/488; 525/104
[58] Field of Search ............................ 528/42; 550/488; 525/104

[56] References Cited

U.S. PATENT DOCUMENTS

| | | | |
|---|---|---|---|
| 3,127,433 | 3/1964 | Tarrant | 528/42 |
| 3,453,232 | 7/1969 | Larson | 528/42 |
| 3,950,588 | 4/1976 | McDougal . | |
| 4,024,306 | 5/1977 | Takamizawa et al. | 528/42 |
| 4,263,371 | 4/1981 | Franz . | |
| 4,276,350 | 6/1981 | Franz . | |
| 4,301,197 | 11/1981 | Franz et al. . | |
| 4,529,657 | 7/1985 | Franz . | |
| 4,549,003 | 10/1985 | Lim et al. | 528/42 |
| 4,574,149 | 3/1986 | Lee et al. | 528/42 |
| 4,617,057 | 10/1986 | Plueddemann . | |
| 4,724,022 | 2/1988 | Armstrong . | |
| 4,879,345 | 11/1989 | Connelly et al. . | |
| 4,983,459 | 1/1991 | Franz et al. . | |
| 4,997,684 | 3/1991 | Franz et al. . | |
| 5,266,358 | 11/1993 | Uemura et al. . | |
| 5,308,705 | 5/1994 | Franz et al. . | |
| 5,314,731 | 5/1994 | Yoneda et al. . | |
| 5,328,768 | 7/1994 | Goodwin . | |
| 5,368,892 | 11/1994 | Berquier . | |
| 5,413,865 | 5/1995 | Nakamura et al. . | |
| 5,421,866 | 6/1995 | Stark-Kasley et al. . | |
| 5,424,130 | 6/1995 | Nakanishi et al. . | |
| 5,425,804 | 6/1995 | Shinohara et al. . | |
| 5,523,162 | 6/1996 | Franz et al. . | |

FOREIGN PATENT DOCUMENTS

| | | |
|---|---|---|
| 0 166 363 | 1/1986 | European Pat. Off. . |
| 0 339 583 | 11/1989 | European Pat. Off. . |
| 0 476 510 | 3/1992 | European Pat. Off. . |
| 0 492 545 | 7/1992 | European Pat. Off. . |
| 0 513 690 | 11/1992 | European Pat. Off. . |
| 0 513 727 | 11/1992 | European Pat. Off. . |
| 0 545 201 | 6/1993 | European Pat. Off. . |
| 0 548 775 | 6/1993 | European Pat. Off. . |
| 0 719 743 | 7/1996 | European Pat. Off. . |
| 3701654 | 7/1987 | Germany . |
| 4218657 | 6/1991 | Germany . |
| 58-172244 | 10/1983 | Japan . |
| 58-172245 | 10/1983 | Japan . |
| 58-211701 | 12/1983 | Japan . |
| 59-222272 | 12/1984 | Japan . |
| 61-278574 | 12/1986 | Japan . |
| 1-95181 | 4/1989 | Japan . |
| 1-154533 | 4/1989 | Japan . |
| 62-252120 | 7/1989 | Japan . |
| 1-275674 | 11/1989 | Japan . |
| 02/311332 | 3/1991 | Japan . |
| 2230260 | 10/1990 | United Kingdom . |

OTHER PUBLICATIONS

European Search Report and Communication for European Application No. EP 96 10 7844, dated Aug. 22, 1996.
European Search Report and Communication for European Application No. EP 96 10 7845, dated Aug. 22, 1996.
Miall & Sharp, "A New Dictionary of Chemistry", 4th edition, p. 440 European Search Report, 29 Mar. 1996.

*Primary Examiner*—Melvyn I. Marquis
*Attorney, Agent, or Firm*—Raymond J. Harmuth

[57] ABSTRACT

A composition comprising perfluoroalkylalkylsilane and a completely hydrolyzable silane or siloxane is disclosed for providing nonwetting properties to the surface of various substrates such as glass, plastic, metal, organic polymer coated substrates or inorganic coated substrates. The nonwetting property, as measured by contact angle of a drop of water on the treated substrate surface, is more durable than the nonwetting property of a surface treated with the same perfluoroalkylalkylsilane with the hydrolyzable silane or siloxane.

20 Claims, No Drawings

WATER REPELLENT SURFACE TREATMENT WITH INTEGRATED PRIMER

CROSS REFERENCE TO RELATED APPLICATION

This application is a continuation of application Ser. No. 08/461,464, filed Jun. 5, 1995, now abandoned, which is a continuation-in-part of U.S. application Ser. No. 08/363,803 filed Dec. 27, 1994, now U.S. Pat. No. 5,523,161 which is a continuation-in-part of U.S. application Ser. No. 08/220,353 filed Mar. 30, 1994, now abandoned which is a continuation-in-part of U.S. application Ser. No. 07/589,235 filed Sep. 28, 1990, now U.S. Pat. No. 5,308,705, which is a continuation-in-part of application Ser. No. 07/503,587 filed Apr. 3, 1990, which is now U.S. Pat No. 4,983,459.

BACKGROUND

1. Field of the Invention

The present invention relates generally to the art of surface treatment and, more particularly, to the art of producing a water repellent surface on various substrates, and most particularly to improving the durability of such water repellent surfaces.

2. Relevant Art

U.S. Pat. No. 5,314,731 to Yoneda et al. describes a surface-treated substrate having at least two treated surface layers wherein the first outermost layer is obtained by treatment with a compound containing at least one Si—NCO group capable of forming a surface having a contact angle of at least 70° against water and the second underlayer is obtained by treatment with at least one reactive silane compound selected from isocyanate silane compounds and hydrolyzable silane compounds.

U.S. Pat. Nos. 4,983,459 and 4,997,684 to Franz et al. disclose an article and method respectively for providing a durable nonwetting surface on glass by treatment with a perfluoroalkylalkyl silane and a fluorinated olefin telomer.

In U.S. Pat. No. 5,308,705 Franz et al. describe providing nonwetting surface properties to substrates other than glass by treatment with a perfluoroalkylalkyl silane and a fluorinated olefin telomer.

In U.S. Pat. No. 5,328,768 Goodwin discloses a glass substrate the surface of which is treated with first a silica primer layer and second a perfluoroalkylalkyl silane.

SUMMARY OF THE INVENTION

The present invention provides a substrate surface with high water repellency and high lubricity. The durability of the water and dirt repellency of a substrate surface is improved by applying to the substrate surface a perfluoroalkylalkylsilane compound and a hydrolyzable silane or siloxane compound. The hydrolyzable silane or siloxane compound is a compound capable of hydrolytic condensation to form silica gel and functions as an integral primer compound. The surface treatment of the present invention provides enhanced durability to the water and dirt repellent surface without requiring a separate primer layer. High water repellency and lubricity are provided by perfluoroalkylalkylsilane. The hydrolyzable silane or siloxane also provides for reactive drying of the solvent. The perfluoroalkylalkylsilane and hydrolyzable silane or siloxane surface treatment of the present invention also provides enhanced abrasion resistance to the substrate surface. Increased resistance to humidity, ultraviolet radiation and mechanical abrasion are provided by the silane or siloxane compound capable of hydrolytic condensation to silica gel.

DESCRIPTION OF THE PREFERRED EMBODIMENT

Durability of rain and soil repellency provided by application of a perfluoroalkylalkylsilane to a substrate surface is enhanced by mixing a silane, siloxane or mixture of silane and/or siloxane compounds capable of hydrolysis to silica gel with a perfluoroalkylalkylsilane prior to application. In accordance with the present invention, a mixture of a perfluoroalkylalkylsilane and silane, siloxane or mixture of silane and/or siloxane compounds capable of hydrolysis to silica gel is applied to the surface of glass to form a coating which is more durable than would have been formed without the silane, siloxane or mixture of silane and/or siloxane compounds capable of hydrolysis to silica gel.

Perfluoroalkylalkylsilane and hydrolyzable silane and/or siloxane are applied to the surface of a substrate to produce the article of the present invention preferably as a colloidal suspension or solution, preferably in an aprotic solvent, preferably an alkane or mixture of alkanes, or a fluorinated solvent. The preferred solution of the present invention is applied to a substrate surface by any conventional technique such as dipping, flowing, wiping or spraying. The silane reacts with the substrate surface, and excess solution is removed, providing a durable, non-wetting, lubricating surface with improved abrasion resistance. The present invention provides the durability benefits of a primer without the additional step of applying a separate primer layer. The use of the completely hydrolyzable silane and/or siloxane improves the humidity, ultraviolet light, and abrasion resistance of the silane surface treatment as measured by the Cleveland Condensing Cabinet, QUV (with FS40 or B313 lamps), and wet sled abrasion tests, indicating a longer useful product lifetime.

Suitable silanes capable of hydrolysis to silica gel have the general formula $SiX_4$ wherein X is a hydrolyzable radical generally selected from the group of halogens, alkoxy and acyloxy radicals.

Preferred silanes are those wherein X is preferably chloro, bromo, iodo, methoxy, ethoxy and acetoxy. Preferred hydrolyzable silanes include tetrachlorosilane, tetramethoxysilane and tetraacetoxysilane.

Suitable siloxanes have the general formula $Si_yO_zX_{4y-2z}$, wherein X is selected from the group of halogen, alkoxy and acyloxy radicals, y is two or more, and z is one or more and $4y-2z$ is greater than zero. Preferred hydrolyzable siloxanes include hexachlorodisiloxane, octachlorotrisiloxane, and higher oligomer chlorosiloxanes.

The hydrolyzable silanes or siloxanes serve two functions. One is to become part of the coating and impart resistance to weathering and abrasion. Another function is to dry the solvent. Typical hydrocarbon solvents can contain 50 to 200 ppm of water. Other solvents can be much higher in water content. For example, a solvent containing 200 ppm water would have enough water present to partially hydrolyze the perfluoroalkylalkylsilane at 0.5 weight percent concentration. The completely hydrolyzable silane or siloxane is capable of eliminating or reducing the water content of the solvent prior to perfluoroalkylalkylsilane addition. Otherwise, partially hydrolyzed perfluoroalkylalkylsilane could result in insufficient coating deposition or very poor durability.

Preferred perfluoroalkylalkylsilanes have the general formula $R_mR'_nSiX_{4-m-n}$, wherein R is a perfluoroalkylalkyl radical; m is typically one, n is typically zero or one, and m+n is less than 4; R' is a vinyl or an alkyl radical, preferably methyl, ethyl, vinyl or propyl; and X is preferably a radical such as halogen, acyloxy, and/or alkoxy. Preferred perfluoroalkyl moieties in the perfluoroalkylalkyl radicals range from $CF_3$ to $C_{30}F_{61}$, preferably $C_6F_{13}$ to $C_{18}F_{37}$, and most preferably $C_8F_{17}$ to $C_{12}F_{25}$; the alkyl moiety is preferably ethyl. R' is preferably methyl or ethyl. Preferred radicals for X include hydrolyzable chloro, bromo, iodo, methoxy, ethoxy and acetoxy radicals. Preferred perfluoroalkylalkylsilanes in accordance with the present invention include perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

These preferred perfluoroalkylethylsilanes appear to react with bonding sites at the substrate surface on a molecular basis. Strong surface bonding of the perfluoroalkylethylsilanes produces a durable substrate surface which exhibits a high contact angle with a drop of water, indicating high water repellency.

Suitable solvents include hexane, heptane, mineral spirits, acetone, toluene and naphtha. Preferred solvents are alkanes or halogenated hydrocarbon solvents such as trichlorotrifluoroethane, and methylene chloride, and perfluorinated organic compounds such as perfluorocarbons Concentrations of about 0.005 to 50, preferably about 0.05 to 5, percent of silane are preferred. The solvent may be evaporated simply by drying in air at ambient temperature, or excess solution preferably may be removed by wiping.

The silanes may also be crosslinked to form a more durable coating. Preferably, curing is accomplished by heating the silane treated surface. Typically, curing temperatures of at least 150° F. (about 66° C. ) are preferred, particularly above 200° F. (about 93° C. ). A cure cycle of about 200° F. (about 93° C. ) for about 30 minutes is suitable. Higher temperatures and shorter heating times may be more efficient. A cure cycle of 2 to 5 minutes at 400 to 500° F. (about 204 to 260° C. ) may be preferred, particularly about 3 minutes at about 470° F. (about 243° C. ). A fluorinated olefin telomer may also be included in the silane composition as described in U.S. Pat. No. 5,308,705, preferably of the general formula $C_mF_{2m+1}CH=CH_2$, where m is from 1 to 30, preferably 1 to 16, more preferably 4 to 10. The substrate surfaces may, in the alternative, be contacted with perfluoroalkylalkylsilane in vapor form.

The contact angles recited herein are measured by the sessile drop method using a modified captive bubble indicator manufactured by Lord Manufacturing, Inc., equipped with Gaertner Scientific goniometer optics. The surface to be measured is placed in a horizontal position, facing upward, in front of a light source. A drop of water is placed on top of the surface in front of the light source so that the profile of the sessile drop can be viewed and the contact angle measured through the goniometer telescope equipped with circular protractor graduation.

Weathering chambers include the Cleveland Condensing Cabinet (CCC) and QUV Tester (products of The Q-Panel Company, Cleveland, Ohio). The CCC chamber was operated at a vapor temperature of 140° F. (60° C. ) in an indoor ambient environment which resulted in constant water condensation on the test surface. The QUV Tester is operated with cycles of 8 hours UV (either B313 or FS40 lamps) at black panel temperature of 65°–70° C. and 4 hours condensing humidity at 50° C.

The present invention will be further understood from the descriptions of specific examples which follow.

EXAMPLE I

A solution was prepared by mixing one gram of tetrachlorosilane and one gram of perfluoroalkylalkylsilane in 40 grams of trichlorotrifluoroethane (Freon® TF solvent, a product of DuPont). The perfluoroalkylalkylsilane comprised perfluoroalkylethyltrichlorosilanes, wherein the perfluoroalkyl moieties comprised primarily $C_6F_{13}$ to $C_{18}F_{37}$. For comparison, a control solution was mixed without the tetrachlorosilane. The solutions were applied to the atmosphere surface of 3.9 millimeter thick Solex® float glass (product of PPG Industries, Inc.) with a cotton pad. Coupons were cured at 200° F. (93° C. ) for one hour. The excess silane was removed from the glass surfaces by solvent washing. Coupons were weathered in the CCC and QUV-FS40 weathering cabinets. Coating efficiency was measured by the contact angle of a sessile drop of water. The results are shown in the following table.

TABLE I

| CCC | | | QUV-FS40 | | |
|---|---|---|---|---|---|
| Hours | Primer | No Primer | Hours | Primer | No Primer |
| 0 | 105° | 105° | 0 | 107° | 106° |
| 496 | 102° | 87° | 319 | 106° | 102° |
| 927 | 67° | 60° | 1332 | 91° | 89° |
| 1669 | 49° | 40° | 2115 | 83° | 79° |
| | | | 2498 | 78° | 70° |
| | | | 2943 | 72° | 57° |

EXAMPLE II

Four solutions were prepared, each of which was 0.5 percent by weight perfluorohexylethyltrichlorosilane in Isopar L solvent (product of Exxon), a mixture of alkanes. The solutions had tetrachlorosilane concentrations of 0.0, 0.2, 0.45, and 0.79 percent by weight. The order of addition was Isopar L, tetrachlorosilane and perfluoroalkylethyltrichlorosilane to utilize the reactive drying of the solvent by the hydrolyzable tetrachlorosilane. These four solutions were coated on the tin surface of coupons of 0.182 inch (4.6 millimeter) thick clear float glass. Samples were tested in the CCC chamber. Coating efficiency was measured by the contact angle of a sessile drop of water. It can be seen in the following table that increasing the concentration of hydrolyzable silane within this range improves the durability of the perfluoroalkylalkylsilane surface treatment.

TABLE II

| | CCC Contact Angle (°) | | | |
|---|---|---|---|---|
| | Primer Concentration (Percent by Weight) | | | |
| Hours | 0 | 0.2 | 0.45 | 0.79 |
| 0 | 115 | 115 | 114 | 114 |
| 122 | 81 | 89 | 105 | 105 |
| 284 | 54 | 65 | 77 | 81 |
| 475 | 36 | 44 | 58 | 69 |
| 642 | — | — | — | 47 |

EXAMPLE III

Four solutions were prepared, each of which was 2.5 percent by weight of the perfluoroalkylethyltrichlorosilane described in Example I and 2.5 percent by weight perfluoroalkylethylene in Fluorinert® FC-77 solvent (a product of 3M). The solutions had tetrachlorosilane concentrations of 0.0, 1.0, 2.0 and 5.0 percent by weight. These four solutions were coated on the tin surface of coupons of 0.187 inch (4.7 millimeter) thick clear float glass. Coupons were cured at 300° F. (149° C. ) for 15 minutes. Samples were tested in the CCC and QUVB-313 chambers. Coating efficiency was measured by contact angle of a sessile drop of water. Results are given in the following tables.

TABLE IIIA

| | CCC Contact Angle (°) Primer Concentration (Percent by Weight) | | | |
|---|---|---|---|---|
| Hours | 0 | 1.0 | 2.0 | 5.0 |
| 0 | 113 | 113 | 115 | 114 |
| 162 | 95 | 109 | 114 | 112 |
| 348 | 73 | 81 | 98 | 93 |
| 684 | 31 | 41 | 43 | 34 |

TABLE IIIB

| | QUVB-313 Contact Angle (°) Primer Concentration (Percent by Weight) | | | |
|---|---|---|---|---|
| Hours | 0 | 1.0 | 2.0 | 5.0 |
| 0 | 113 | 114 | 117 | 116 |
| 566 | 107 | 111 | 111 | 109 |
| 1375 | 82 | 95 | 95 | 87 |
| 2095 | 72 | 80 | 84 | 71 |

EXAMPLE IV

Solutions were prepared comprising 0.5 percent by weight perfluoroalkylethyltrichlorosilane with and without 0.5 percent by weight tetrachlorosilane in Isopar L solvent. Three perfluoroalkylethyltrichlorosilanes were employed: 1H, 1H, 2H, 2H-tridecafluorooctyltrichlorosilane ("octyl"), 1H,1H,2H,2H-heptadecafluorodecyltrichlorosilane ("decyl"), or a mixture of perfluoroalkylethyltrichlorosilanes described in Example I. Tempered Solex® glass coupons and clear float glass coupons that had undergone a heat treatment which simulates a bending cycle (without bending significantly) were used in this study. The Solex glass was 0.157 inch (4 millimeters) thick, the clear float was 0.090 inch (2.3 millimeters) thick, and the tin surfaces were treated. Samples were tested in the QUVB-313 chamber and on a Wet Sled Abrader (Sheen Instruments LTD, Model 903). The Wet Sled Abrader was custom modified with an aluminum block which held two automotive windshield wiper blades. The wet sled abrasion test thus configured has an unusually high pressure wiper arm loading and is done partially wet and partially dry. These wiper strokes are much more severe than normally used in vehicles. Coating efficiency was measured by the contact angle of a sessile drop of water. The plus sign "+" refers to the presence of tetrachlorosilane in the coating formulations in the following tables.

TABLE IVA

| | QUVB-313 Contact Angle (°) | | | | | |
|---|---|---|---|---|---|---|
| Hours | octyl | octyl+ | decyl | decyl+ | mix | mix+ |
| 0 | 116 | 112 | 111 | 115 | 111 | 118 |
| 163 | 102 | 105 | 87 | 112 | 102 | 116 |
| 352 | 95 | 95 | 84 | 107 | 100 | 100 |
| 496 | 82 | 88 | 74 | 102 | 89 | 106 |
| 659 | 79 | 80 | 66 | 93 | 82 | 99 |
| 827 | 70 | 85 | 60 | 89 | 82 | 103 |

TABLE IVB

| | Wet Sled Abrasion Contact Angle (°) | | | | | |
|---|---|---|---|---|---|---|
| Cycles | octyl | octyl+ | decyl | decyl+ | mix | mix+ |
| 0 | 113 | 117 | 111 | 116 | 115 | 117 |
| 200* | 86 | 104 | 79 | 108 | 86 | 108 |
| 600* | 52 | 99 | 78 | 106 | 79 | 105 |
| 5000 | 35 | 84 | 47 | 91 | 82 | 92 |

*These data (at 200 and 600 cycles) were obtained with a slurry of 0.5 percent by weight Hi-Sil® 233 synthetic precipitated silica in water. The data for 5000 cycles were obtained using deionized water only.

EXAMPLE V

A control solution was prepared by mixing 95 grams of FC-77 solvent, 2.5 grams of perfluoroalkylethyltrichlorosilanes (perfluoroalkyl=$C_6F_{13}$ to $C_{18}F_{37}$), and 2.5 grams of perfluoroalkylethylene. A primer-containing solution was prepared by mixing 188 grams of FC-77 solvent, 5 grams of perfluoroalkylethyltrichlorosilanes, 5.0 grams of perfluoroalkylethylene (perfluoroalkyl=$C_6F_{13}$ to $C_{18}F_{37}$), and 2 grams of tetrachlorosilane. A primer only solution was prepared from 198.4 grams of FC-77 solvent and 1.6 grams of tetrachlorosilane. These solutions were applied to the tin surface of 4.9 millimeter thick clear float glass with a cotton pad. Selected coupons were coated with primer solution prior to coating with either control solution or the solution containing perfluoroalkylalkylsilane and tetrachlorosilane. Coupons were cured at 300° F. (149° C.) for 15 minutes. The excess silane was removed from the glass surfaces by solvent washing. Coupons were weathered in the CCC. Coating efficiency was measured by the contact angle of a sessile drop of water.

TABLE V

| | CCC Contact Angle (°) | | | |
|---|---|---|---|---|
| | No primer layer | | Primer layer | |
| Hours | No integral primer | Integral primer | No integral primer | Integral primer |
| 0 | 114 | 114 | 113 | 114 |
| 232 | 116 | 116 | 117 | 115 |
| 398 | 100 | 110 | 109 | 110 |
| 590 | 49 | 78 | 75 | 86 |
| 918 | 29 | 39 | 31 | 41 |

The solution containing a silane hydrolyzable to silica led to more durable coatings whether or not the glass was preprimed with a silica layer separately with a solution of a hydrolyzable silane.

The above examples are offered to illustrate the present invention. Various perfluoroalkylalkylsilanes, hydrolyzable silanes, solvents and concentrations may be applied by any conventional technique, and optimally cured at suitable temperatures for adequate times to provide durable non-wetting surfaces to any of a variety of glass and plastic substrates, as well as other inorganic surfaces such as metals, ceramics, enamels, and metal or metal oxide films. The treated substrates of the present invention are especially suitable in automobile and aircraft parts, as well as in building components, lenses and CRT plates.

I claim:

1. A composition for producing a water repellent surface on a substrate comprising a mixture of:
  a perfluoroalkylalkylsilane selected from compounds having the general formula $R_m R'_n SiX_{4-m-n}$, wherein R is a perfluoroalkylalkyl radical, R' is a vinyl or an alkyl radical, m is 1, 2 or 3, n is 0, 1 or 2 and m+n is less than 4, and X is selected from the group consisting of halogen and acyloxy radicals, and a compound selected from the group consisting of silanes and siloxanes capable of hydrolysis to a silica gel.

2. A composition according to claim 1, wherein the perfluoroalkyl moiety of said perfluoroalkylalkyl radical is selected from $CF_3$ to $C_{30}F_{61}$.

3. A composition according to claim 1, wherein R' is selected from the group consisting of methyl, ethyl, vinyl and propyl.

4. A composition according to claim 1, wherein X is selected from the group consisting of chloro, bromo, iodo and acetoxy.

5. A composition according to claim 1, wherein said perfluoroalkylalkylsilane is selected from the group consisting of perfluoroalkylethyltrichlorosilane, perfluoroalkylethyltriacetoxysilane and perfluoroalkylethyldichloro(methyl)silane.

6. A composition according to claim 1, wherein said silane capable of hydrolysis to a silica gel has the general formula $SiX_4$, wherein X is selected from the group consisting of halogen, alkoxy and acyloxy radicals.

7. A composition for producing a water repellent surface on a substrate comprising a mixture of:

a perfluoroalkylalkylsilane selected from compounds having the general formula $R_mR'_nSiX_{4-m-n}$, wherein R is a perfluoroalkylalkyl radical, R' is a vinyl or an alkyl radical, m is 1, 2 or 3, n is 0, 1 or 2 and m+n is less than 4, and X is selected from the group consisting of halogen, alkoxy and acyloxy radicals, and a silane capable of hydrolysis to a silica gel, wherein said silane has the general formula $SiX_4$, wherein X is halogen.

8. A composition according to claim 7, wherein said silane capable of hydrolysis to a silica gel is silicon tetrachloride.

9. A composition according to claim 1, wherein said siloxane capable of hydrolysis to a silica gel has the general formula $Si_yO_zX_{4y-2z}$ wherein X is selected from the group of halogen, alkoxy and acyloxy radicals, y is two or more and z is one or more and 4y-2z is greater than zero.

10. A composition for producing a water repellent surface on a substrate comprising a mixture of:

a perfluoroalkylalkylsilane selected from compounds having the general formula $R_mR'_nSiX_{4-m-n}$, wherein R is a perfluoroalkylalkyl radical, R' is a vinyl or an alkyl radical, m is 1, 2 or 3, n is 0, 1 or 2 and m+n is less than 4, and X is selected from the group consisting of halogen, alkoxy and acyloxy radicals;

a compound selected from the group consisting of silanes and siloxanes wherein the silanes and siloxanes are capable of hydrolysis to a silica gel, and a fluorinated olefin telomer having the general formula $C_mF_{2m+1}CH=CH_2$ where m is from 1 to 30.

11. A composition according to claim 1 wherein said mixture of the perfluoroalkylalkylsilane and said silane capable of hydrolysis to a silica gel are in a solvent selected from the group consisting of alkanes, minerals spirits, acetone, toluene, naphtha, halogenated hydrocarbons, perfluorinated organic solvents, and mixtures thereof.

12. A composition according to claim 11, wherein the perfluoroalkyl moiety of said perfluoroalkylalkyl radical is $CF_3$ to $C_{30}F_{61}$.

13. A composition according to claim 11, wherein R' is selected from the group consisting of methyl, ethyl, vinyl and propyl.

14. A composition according to claim 11, wherein X is selected from the group consisting of chloro, bromo, iodo and acetoxy.

15. A composition according to claim 11, wherein said solvent is selected from the group consisting of hexane, heptane, mineral spirits, acetone, toluene, naphtha, trichlorotrifluoroethane, methylene chloride, perfluorocarbons and mixtures thereof.

16. A composition according to claim 11, wherein said silane capable of hydrolysis to a silica gel has the general formula $SiX_4$, wherein X is selected from the group consisting of halogen, alkoxy and acyloxy radicals.

17. A composition according to claim 16, wherein the silane capable of hydrolysis to silica gel is silicon tetrachloride.

18. A composition according to claim 11, further comprising a fluorinated olefin telomer having the general formula $C_mF_{2m+1}CH=CH_2$ where m is 1 to 30.

19. A composition according to claim 1, wherein the mixture consists essentially of the perfluoroalkylalkylsilane and the compound.

20. A composition according to claim 1, wherein the mixture consists essentially of the perfluoroalkylalkylsilane and the compound in a solvent.

* * * * *